United States Patent
Fu et al.

(10) Patent No.: US 10,854,193 B2
(45) Date of Patent: Dec. 1, 2020

(54) METHODS, DEVICES AND COMPUTER-READABLE STORAGE MEDIA FOR REAL-TIME SPEECH RECOGNITION

(71) Applicant: BAIDU ONLINE NETWORK TECHNOLOGY (BEIJING) CO., LTD., Beijing (CN)

(72) Inventors: Xiaoyin Fu, Beijing (CN); Jinfeng Bai, Beijing (CN); Zhijie Chen, Beijing (CN); Mingxin Liang, Beijing (CN); Xu Chen, Beijing (CN); Lei Jia, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 116 days.

(21) Appl. No.: 16/269,411

(22) Filed: Feb. 6, 2019

(65) Prior Publication Data
US 2020/0219486 A1    Jul. 9, 2020

(30) Foreign Application Priority Data
Jan. 8, 2019    (CN) .......................... 2019 1 0016861

(51) Int. Cl.
*G10L 15/10*    (2006.01)
*G10L 15/02*    (2006.01)
*G06F 3/16*    (2006.01)

(52) U.S. Cl.
CPC .............. *G10L 15/10* (2013.01); *G06F 3/167* (2013.01); *G10L 15/02* (2013.01); *G10L 2015/025* (2013.01); *G10L 2015/027* (2013.01)

(58) Field of Classification Search
CPC ... G10L 15/10; G10L 15/02; G10L 2015/025; G10L 2015/027; G10L 15/28; G10L 15/16; G10L 15/26; G06F 3/167
USPC .......................................................... 704/231
See application file for complete search history.

(56) References Cited

U.S. PATENT DOCUMENTS

| | | | |
|---|---|---|---|
| 10,229,672 B1 * | 3/2019 | Rao ........................ | G10L 15/187 |
| 2017/0011738 A1 * | 1/2017 | Senior ................... | G10L 15/063 |
| 2018/0233130 A1 * | 8/2018 | Kaskari ................... | G10L 15/16 |
| 2018/0253648 A1 * | 9/2018 | Kaskari .................. | G06N 3/084 |
| 2018/0254039 A1 * | 9/2018 | Qian ...................... | G10L 15/183 |
| 2019/0279614 A1 * | 9/2019 | Ye ............................ | G10L 15/16 |
| 2020/0125951 A1 * | 4/2020 | Mosayyebpour ....... | G10L 15/16 |
| 2020/0126556 A1 * | 4/2020 | Mosayyebpour ..... | G10L 15/063 |

(Continued)

OTHER PUBLICATIONS

Yuan Z, Lyu Z, Li J, Zhou X. An improved hybrid CTC-Attention model for speech recognition. arXiv preprint arXiv:1810.12020. Oct. 29, 2018.*

(Continued)

*Primary Examiner* — Edwin S Leland, III
(74) *Attorney, Agent, or Firm* — Lathrop GPM LLP (57) ABSTRACT

Methods, apparatuses, devices and computer-readable storage media for real-time speech recognition are provided. The method includes: based on an input speech signal, obtaining truncating information for truncating a sequence of features of the speech signal; based on the truncating information, truncating the sequence of features into a plurality of subsequences; and for each subsequence in the plurality of subsequences, obtaining a real-time recognition result through attention mechanism.

20 Claims, 5 Drawing Sheets

(56) References Cited

U.S. PATENT DOCUMENTS

2020/0219486 A1* 7/2020 Fu .......................... G10L 15/26

OTHER PUBLICATIONS

Chiu CC, Raffel C. Monotonic chunkwise attention. arXiv preprint arXiv:1712.05382. Dec. 14, 2017.*

Raffel C, Luong MT, Liu PJ, Weiss RJ, Eck D. Online and linear-time attention by enforcing monotonic alignments. arXiv preprint arXiv:1704.00784. Apr. 3, 2017.*

Fan R, Zhou P, Chen W, Jia J, Liu G. An online attention-based model for speech recognition. arXiv preprint arXiv:1811.05247. Nov. 13, 2018.*

* cited by examiner

METHODS, DEVICES AND COMPUTER-READABLE STORAGE MEDIA FOR REAL-TIME SPEECH RECOGNITION

CROSS REFERENCE TO RELATED APPLICATION

This application claims priority to Chinese Patent Application No. 201910016861.1, filed on Jan. 8, 2019, the entire content of which is incorporated herein by reference.

TECHNICAL FIELD

Embodiments of the present disclosure generally relates to the field of speech recognition, and more particularly, to methods, apparatuses, devices and computer-readable storage media for real-time speech recognition.

BACKGROUND

Speech recognition refers to translating speech signals into texts through computers, which is one of the main ways of realizing human-machine interaction. In recent years, the speech recognition accuracy has been greatly improved as deep learning is referred extensively in the field of speech recognition. In addition, occasions of speech recognition have become richer because of the popularity of smart devices. For example, speech recognition has been widely applied in various occasions such as voice input, voice dialing, and car navigation. Speech recognition, combining with natural language processing and speech synthesis, may generate complex applications, such as smart speakers, simultaneous interpretation, and intelligent customer service assistants. The speech recognition accuracy directly affects the user experience of speech-related products. Therefore, as the enrichment of speech recognition applications, higher requirements are placed on the speech recognition accuracy.

Real-time speech recognition is a procedure that each segment of the received continuously speech is recognized in real time to obtain the recognition result when the recognition begins, without waiting for the end of inputting the whole speech. In online continuous speech recognition of large-scale vocabulary, key factors affecting system performance are the recognition accuracy and response speed of the system. For example, in a scene where the user desires to see the recognition result being displayed in real time while speaking, the speech recognition system is required to decode the speech signal and output the recognition result timely while maintaining a high recognition rate. If the recognition begins when the user completes the speech input, it will seriously affect the user experience and cause unsmooth speech interaction.

SUMMARY

Methods, apparatuses, devices and computer-readable storage media for real-time speech recognition are provided according to embodiments of the present disclosure.

In a first aspect of the present disclosure, a method for real-time speech recognition is provided. The method includes: based on an input speech signal, obtaining truncating information for truncating a sequence of features of the speech signal; based on the truncating information, truncating the sequence of features into a plurality of subsequences; and for each subsequence in the plurality of subsequences, obtaining a real-time recognition result through attention mechanism.

In a second aspect of the present disclosure, an electronic device is provided. The electronic device includes one or more processors and a storage device. The storage device is configured to store one or more programs. When the one or more programs are executed by the one or more processors, the electronic device is caused to implement a method or procedure according to an embodiment of the present disclosure.

In a third aspect of the present disclosure, a computer-readable storage medium is provided. The computer-readable storage medium has stored therein computer programs. When the computer programs are executed by a processor, a method or procedure according to an embodiment of the present disclosure is implemented.

It is to be understood that the content described at the summary of the present disclosure is not intended to limit the scope of the present disclosure. Other features of the present disclosure will be readily understood by the following description.

BRIEF DESCRIPTION OF THE DRAWINGS

With reference to the accompanying drawings and the following detailed description, the above and other features, advantages and aspects of the various embodiments of the present disclosure will become more apparent. In the drawings, the same or similar reference numerals indicate the same or similar elements.

DETAILED DESCRIPTION

Embodiments of the present disclosure will be described in more detail below with reference to the accompanying drawings. While the drawings illustrate certain embodiments of the present disclosure, it should be understood that the present disclosure may be implemented in various forms and should not be construed as the embodiments set forth herein. Instead, these embodiments are provided for a more thorough and complete understanding of the present disclosure. The drawings and embodiments of the present disclosure are illustrative only and do not limit the scope of the present disclosure.

In the description of the embodiments of the present disclosure, the term "comprises" and the like should be understood as open-ended, i.e., "comprises but not is limited to". The term "based on" should be understood as "based on at least in part". The term "one embodiment" or "an embodiment" should be taken as "at least one embodiment". The term "some embodiments" should be understood as "at least some embodiments". Other explicit and implicit definitions may also be included below.

The conventional speech recognition system may include three parts, i.e., an acoustic model, a language model and a decoder. A procedure 100 for conventional speech recognition may be illustrated in FIG. 1. After a speech signal 110 is collected, signal processing and feature extraction is performed to the speech signal 110 at block 120, which include extracting features from the speech signal 110 for processing through the acoustic model 132, and also include some signal processing to reduce the impact of environmental noise or other factors on the features.

Figure 1:
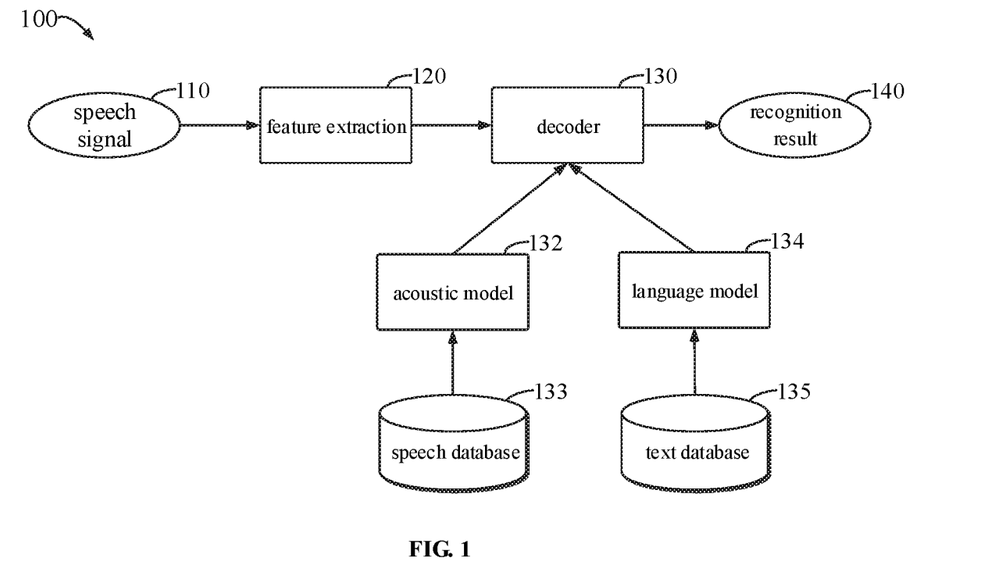
FIG. 1 illustrates a schematic diagram of a procedure for conventional speech recognition.

As illustrated in FIG. 1, after the features are extracted, the features are input to a decoder 130, and processed by the decoder 130 to output a recognition result 140. The decoder 130 finds an output sequence of words of the speech signal, with a maximum probability, based on the acoustic model 132 and the language model 134. The acoustic model 132 may implement translating from speech to syllable, while the language model 134 may implement translating from syllable to text. The acoustic model 132 may model the speech signal by using information such as acoustics, phonetics, environmental characteristics, speaker's gender, and speaker's accent. For example, the acoustic model 132 may model by using a hidden Markov model (HMM) to represent a posterior probability of a sequence of feature vectors of the speech for a certain sequence of states. The language model 134 may model the language. In general, a statistical N-gram (N-Gram) may be used, i.e., a probability of occurrence of top N words or post N words is analyzed. As illustrated in FIG. 1, the acoustic model 132 may be trained and/or operate based on a speech database 133, and the language model 134 may be trained and/or operate based on a text database 135.

Typically, in order to reduce the complexity and computation of the model, the acoustic model 132 and the language model 134 are trained and optimized separately as two models. As illustrated in FIG. 1, establishing the speech recognition system may require a combination of modules such as feature extraction, acoustic model training, language model training, and decoder optimization. In particular, the acoustic model training usually requires professionals with acoustic knowledge, which increases the complexity and labor cost of the speech recognition system.

With the development of neural network technology, each module of the acoustic model is gradually replaced by a neural network, which not only simplifies the complexity of the acoustic model and reduces the difficulty of developing and debugging the model, but also significantly improves the performance of the speech recognition system. For example, an acoustic model of deep neural network (DNN)+HMM has emerged. Based on this structure, the acoustic model further introduces a network such as deep convolutional neural network (CNN), gated recurrent unit (GRU) network, and long short-term memory network (LSTM), to replace the DNN model, which significantly improves the modeling accuracy through the neural network model.

The connectionist temporal classification (CTC) model is an end-to-end model for speech recognition of large-scale vocabulary, in which the acoustic model of DNN+HMM is completely replaced by a unified neural network, thereby greatly simplifying the structure and training difficulty of the acoustic model, and further improving the speech recognition accuracy system.

However, the inventors of the present disclosure have recognized that the CTC model has the following disadvantages. (1) Although the CTC model belongs to the end-to-end model, the CTC model still requires an independence assumption that the distribution of the output sequence satisfies certain conditions. This independence assumption causes the CTC model to be unable to employ effectively the information of the language model in the procedure of training the acoustic model. When the input speech signal has certain environmental noise or low signal strength, for the speech recognition system, it is difficult to distinguish effectively the input audio features based on acoustic information only, which is easy to cause declining of the recognition performance. (2) The CTC model tends to produce insertion and deletion errors with a certain proportion. Although these errors may be alleviated to some extent when decoding by designing the weight of the language model, it is impossible to solve fundamentally the insufficient modeling ability of the CTC model.

An attention model is an extension of an encoder-decoder model, which may improve the prediction effect on longer sequences. Firstly, the audio features are encoded by using the GRU or LSTM model to obtain the implicit features, and different parts of these implicit features are assigned to corresponding weights through the attention model. Finally, the decoder outputs the corresponding text according to the different modeling granularity. This modeling way of combining acoustic and language models may further simplify the complexity of the speech recognition system.

However, the inventors of the present disclosure have recognized that the attention model still has the following disadvantages. (1) The conventional attention model cannot realize real-time speech recognition. In the online speech interaction product or service, segments of the speech are uploaded from the user device to the server one by one. When each fragment comes, it is required to decode the current fragment, so that the decoding time may be parallel with the transmission process. After the user finishes speaking, the time for waiting for the recognition result is the decoding time of the last packet. This procedure is called streaming decoding (also called "real-time recognition"). However, in the conventional attention model, the speech recognition system may start decoding only when all the speech signals are input. The time for waiting for the recognition result is the decoding time of the entire speech. In this way, the attention model based on the whole sentence causes the user to wait for a long time and cannot perform real-time speech interaction, so that it cannot be employed in industrial speech interaction products. (2) The conventional attention model has poor effect on modeling long sentences, resulting in low recognition accuracy. The attention model based on the whole sentence needs to model based on information of the whole sentence. However, according to the length of speech frames, the sentence information for speech recognition may reach several thousand frames. The essence of attention modeling is to eliminate redundant features and select the essential features for the modeling unit. If the range of candidate features is too large (for example, the convention attention model needs to model on a range of thousands of frames), while the convergence of deep learning is not a standard convex optimization, it is difficult to make the attention learning procedure to converge to the frame that truly describe the essential features for the current modeling unit, resulting in a decline on the modeling ability and a poor modeling effect on long sentences.

Improvements to the attention model have emerged, such as segmenting input features according to a fixed heuristics length. However, such segmenting with the fixed length does not take into account the input sequence of audio features. Therefore, it is easy to exclude the effective sequence of features, and difficult to adapt to a situation that speed and pause constantly changes, such as the speech recognition. Therefore, although these improvements may realize the real-time speech recognition partly, the speech recognition accuracy is sacrificed, resulting in lower recognition accuracy than the conventional attention model based on the whole sentence. That is, the conventional speech recognition cannot perform real-time speech recognition, or the recognition accuracy is low. Therefore, accurate real-time speech recognition cannot be realized.

In order to solve one or more of the problems in the above conventional techniques, embodiments of the present disclosure propose a scheme for real-time speech recognition based on truncation attention, which guide the attention model to learn by using truncating information. By introducing truncating information determined based on the speech signal into the conventional attention model, embodiments of the present disclosure may guide the attention model to perform attention modeling for each truncation, which realizes continuous speech recognition and ensure high accuracy. Alternatively, the truncation information may be spike information of the speech signal, obtained by performing CTC processing. Alternatively, a double-head structure of CTC and attention, proposed by some embodiments of the present disclosure, may ensure a small computation amount of the real-time speech recognition. The multi-level attention structure proposed by some embodiments of the present disclosure may further improve the speech recognition accuracy. Some example implementations of the present disclosure will be described in detail below with reference to FIGS. 2-8.

Figure 2:
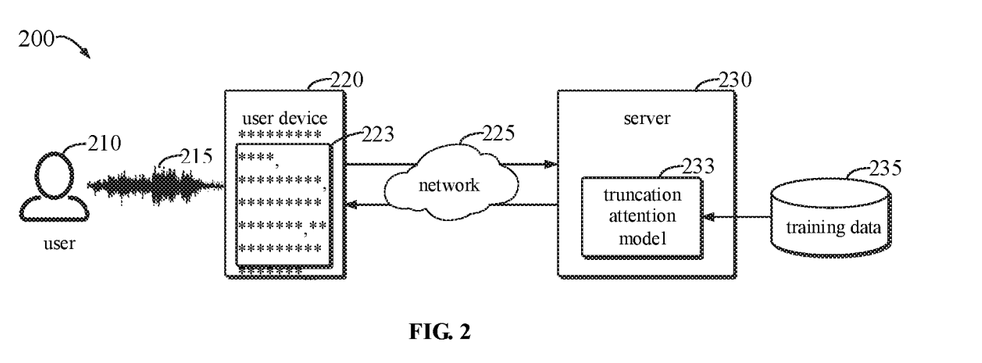
FIG. 2 illustrates a schematic diagram of a scene for real-time speech recognition according to an embodiment of the present disclosure.

FIG. 2 illustrates a schematic diagram of a scene 200 for real-time speech recognition according to an embodiment of the present disclosure. It should be understood that the scene 200 is an example that may be implemented by the embodiments of the present disclosure, and is not intended to limit the scope of the present disclosure.

As illustrated in FIG. 2, in the scene 200, a user 210 is speaking to a user device 220. The speech 215 (i.e., sound) generated by the user 210 is collected by the user device 220, for example, the speech 215 may be collected by a sound collection device of the user device 220, such as a microphone. The user device 220 may be any electronic device capable of collecting speech signals, such as smart phones, tablets, desktop computers, notebook computers, smart wearable devices (such as smart watches, smart glasses), navigation devices, multimedia player devices, educational equipment, gaming equipment, smart speakers, and the like.

In the procedure of collecting the speech 215, the user device 220 may send the speech 215 to a server 230 one by one in segments via a network 225. The server 230 may include a truncation attention model 233 for speech recognition according to an embodiment of the present disclosure (in some embodiments of the present disclosure, the truncation attention model 233 may be a streaming multi-level truncation attention (SMLTA) model based on CTC spike information). The network 225 may be any wired network, wireless network, or a combination of wired and wireless networks. The truncation attention model 233 may be trained by training data 235 such that it may implement real-time and accurate speech recognition. After the recognition is completed, the recognition result may be sent to the user device 220 via the network 225.

The user device 220 may display the recognition result in real time through a display 223. Since the embodiments of the present disclosure are capable of recognizing speech in real time, as the speech 215 is continuously generated, the recognition result displayed on the display 223 is also dynamically changed, so that the user may know the recognition result in real time and enhance the user experience. In some embodiments, the user device 220 may not include the display 223. Instead, the user device 220 may output the recognition result through an audio output device (e.g., a speaker). In still other embodiments, the server 230 may perform further actions based on the recognition result without transmitting it to the user device 220.

It should be understood that although the scene 200 in FIG. 2 illustrates that the truncation attention model 233 is deployed on the server 230 remote from the user device 220, the truncation attention model 233 may also be deployed locally on the user device 220. Alternatively, a part of the truncation attention model 233 may be deployed locally on the user device 220, and another part of the truncation model 233 may be deployed on the server 230, or the truncation attention model 233 may be distributed at a plurality of servers. Embodiments of the present disclosure do not limit the manner and location in which the truncation attention model 233 is deployed.

Figure 3:
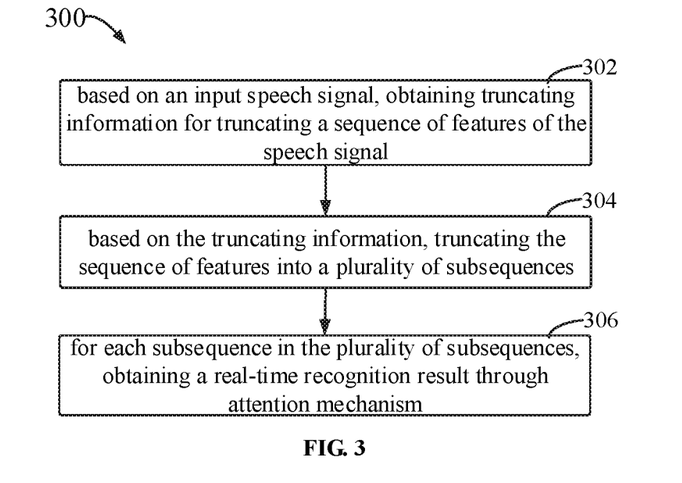
FIG. 3 illustrates a flow chart of a method for real-time speech recognition according to an embodiment of the present disclosure.

FIG. 3 illustrates a flow chart of a method 300 for real-time speech recognition according to an embodiment of the present disclosure. It should be understood that the method 300 may be performed by the server 230 or the user device 220 described above, or a combination thereof. To describe the method 300 clearly, the method 300 is described herein with reference to a procedure 400 for real-time speech recognition based on the truncation attention model in FIG. 4.

Figure 4:
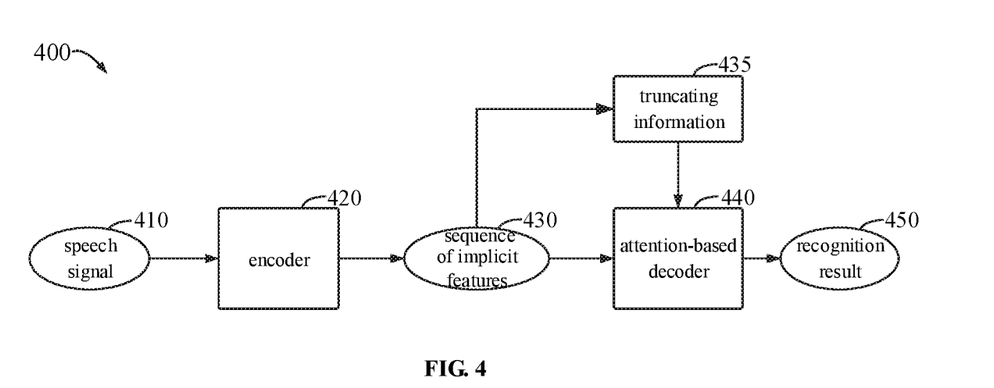
FIG. 4 illustrates a schematic diagram of a procedure for real-time speech recognition according to an embodiment of the present disclosure.

At block 302, based on an input speech signal, truncating information for truncating a sequence of features of the speech signal is obtained. For example, the sequence of features may be obtained by encoding the speech signal. For example, as illustrated in FIG. 4, after collecting the speech signal 410 from the user, the encoder 420 may encode the speech signal 410 into the sequence 430 of implicit features and the truncating information 435 is determined from the sequence 430 of implicit features. Therefore, the embodiment of the present disclosure may employ the truncating information calculated based on the features of the input speech signal, so that the subsequent truncation does not affect the speech recognition accuracy, thereby both realizing real-time recognition of the speech signal and ensuring the speech recognition accuracy.

In some embodiments, the truncating information may be spike information related to the speech signal by performing CTC on the sequence of features. A sequence of peaks may be output through CTC. The peaks may be separated by a blank (blank). One peak may represent a syllable or a set of phones, such as a combination of high-frequency phones. It is to be understood that although the following herein describe by using CTC spike information as an example of providing the truncating information, any other models and/or algorithms currently known or developed in the future, which are capable of providing the truncating information, are also in conjunction with the embodiments of the present disclosure.

At block 304, based on the truncating information, the sequence of features is truncated into a plurality of subsequences. For example, as illustrated in FIG. 4, an attention-based decoder 440 may truncate the sequence 430 of implicit features into the plurality of subsequences based on the truncating information. The sequence of implicit features may be a vector representing the features of the speech signal. For example, the sequence of implicit features may refer to a feature vector that is not directly observable but that may be determined by an observable variable. Unlike the conventional technique of using a fixed-length truncation mode, the embodiment of the present disclosure performs feature truncation by employing the truncating information determined based on the speech signal, thereby avoiding the exclusion of effective features, and enabling high accuracy.

At block 306, for each subsequence in the plurality of subsequences, a real-time recognition result is obtained through attention mechanism. For example, the decoder 440 may employ an attention model to obtain a recognition result 450 for each subsequence of implicit features. The attention model is capable of selecting features for weighting and assigning corresponding weights to different parts of the implicit feature. Any models and/or algorithms based on attention mechanisms currently known or developed in the future may be used in conjunction with embodiments of the present disclosure. Therefore, by introducing the truncating information determined based on the speech signal into the conventional attention model, the embodiment of the present disclosure may guide the attention model to perform attention modeling for each truncation, which realizes continuous speech recognition and ensure high accuracy.

In some embodiments, after the sequence of implicit features is truncated into a plurality of subsequences, a first attention modeling of an attention model may be performed on a first one of the plurality of subsequences, and a second attention modeling of the attention model may be performed on a second one of the plurality of subsequences. The first attention modeling is different from the second attention modeling. That is, embodiments of the present disclosure are capable of performing attention modeling partly of the truncation attention model.

Figure 5:
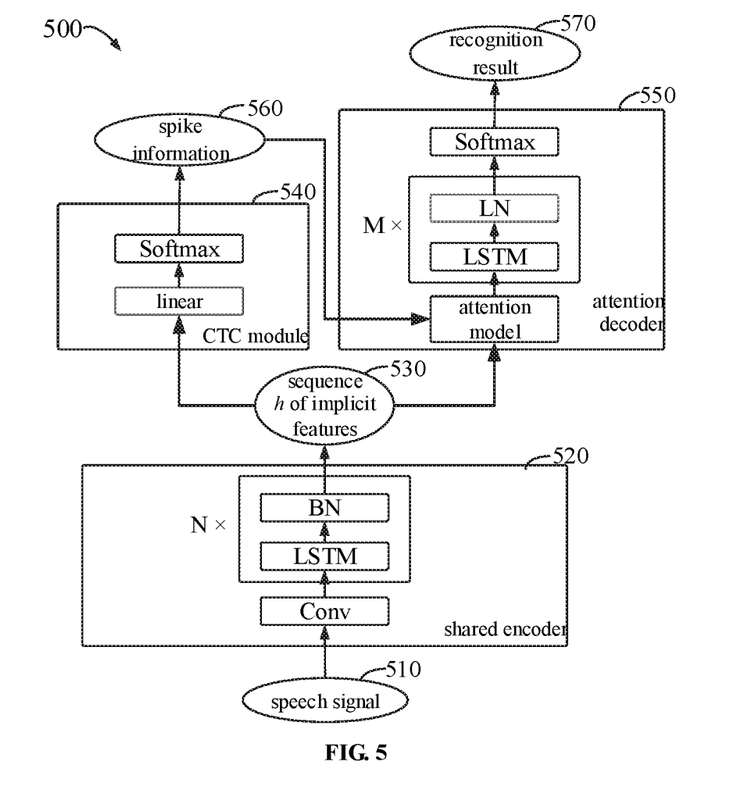
FIG. 5 illustrates a schematic diagram of an example structure of a streaming multi-level truncation attention (SMLTA) model based on connectionist temporal classification (CTC) spike information according to an embodiment of the present disclosure.

FIG. 5 illustrates a schematic diagram of an example structure of a streaming multi-level truncation attention (SMLTA) model based on CTC spike information according to an embodiment of the present disclosure. As illustrated in FIG. 5, a structure 500 may include three parts: a shared decoder 520 configured to encode the input speech signal 510 into a sequence 530 of implicit features (i.e., a sequence h of implicit features); a CTC module 540 configured to obtain the spike information 560 based on the sequence 530 of implicit features; and an attention decoder 550 configured to obtain the real-time recognition result 570 based on the sequence 530 of implicit features and the spike information 560. In the structure 500 illustrated in FIG. 5, the shared encoder 520 is shared by the CTC module 540 and the attention decoder 550 to form a double-headed structure having two heads of the CTC module 540 and the attention decoder 550. Since the computation amount in the structure 550 concerns on the shared encoder 520 and the attention decoder 550, the structure 500 according to an embodiment of the present disclosure hardly increases the computation amount of the entire structure, compared to the conventional attention model. Although there is an increase in the computation amount, the increase is particularly small and may be neglected. The structure 500 may provide the CTC output (i.e., spike information 560) and the attention output (i.e., the recognition result 570), which may well solve a problem of large-scale industrial deployment of the structure 500 according to embodiments of the present disclosure. On the contrary, the conventional way of combining the two models in the product may result in a doubling of the computation amount online, resulting in excessive cost and not being applied to large-scale industrial applications.

As illustrated in FIG. 5, the shared encoder 520 includes one convolution layer (Cony), N LSTMs, and N batch normalization (BN) layer, where N may be a positive integer (e.g., 5, etc.). LSTM may be unidirectional. For a given input speech signal, the shared encoder 520 firstly encodes the speech signal to obtain a corresponding sequence 530 of implicit features. In some embodiments, the speech signal 510 have been subjected to feature extraction to obtain a model input x before being input to the shared encoder 520. It should be understood that although the internal hierarchical structure of the shared encoder 520 is illustrated in FIG. 5, encoders with other structure may be used in conjunction with the embodiments of the present disclosure.

The CTC module 540 includes a linear layer and a normalization (Softmax) layer. The CTC module 540 employs CTC training criteria to obtain a description of a spike of the sequence 530 of implicit features, thereby generating the CTC output including the spike information 560. The CTC output is transmitted to the attention decoder 550 for truncating the sequence 530 of implicit features into a plurality of subsequences by using the spike information 560.

With reference to FIG. 5, the attention decoder 550 includes an attention model layer, M LSTM layers, M layer normalization (LN) layers, and a Softmax layer, where M may be a positive integer (e.g., 2 etc.). The LSTM may be unidirectional. The attention decoder 550 may truncate the sequence 530 of implicit features into contiguous subsequence based on the sequence 530 of implicit feature and the spike information 560. The attention decoder 550 filters the subsequences through an attention mechanism, and finally obtains a corresponding output probability distribution. Since the shared encoder 520 and the decoder 550 use the unidirectional LSTM as the basic, and the manner of truncating the sequence of implicit features into subsequences depends only on history information of the implicit features, the speech recognition system may decode the audio signal in real time while the audio signal is input, without waiting until the entire audio signal is input, realizing real-time speech recognition. Although the internal hierarchical structure of the decoder 550 is illustrated in FIG. 5, decoders with other structure may be used in conjunction with the embodiments of the present disclosure.

In the compact STMLA model integrated with CTC and attention in FIG. 5, it has the head of the CTC module 540 and the head of the attention decoder 550, and the training may be performed on the both heads together. The head of the CTC module 540 is trained with a CTC loss function, and the head of the attention decoder 550 is trained with a cross-entropy loss function. The two loss functions are connected by linear difference weights, i.e., the two loss functions each has a respective weight. This model online almost has the same computation amount as one model, but provides both CTC and attention information, thereby realizing large-scale industrial deployment.

Because there are certain insertion and deletion errors in the spike information output by the CTC module, such errors are likely to cause inaccuracies in boundaries of the subsequences of implicit features, which affect the performance of the speech recognition system. In order to alleviate the deviation caused by the insertion and deletion errors of the CTC module, embodiments of the present disclosure also provide a method for stepwise screening subsequences based on multi-level attention structure, which outputs the final probability distribution through the LSTM model based on the attention decoder. For example, FIG. 6 illustrates a schematic diagram 600 of an example principle of an SMLTA model based on two-level attention structure according to an embodiment of the present disclosure.

Figure 6:
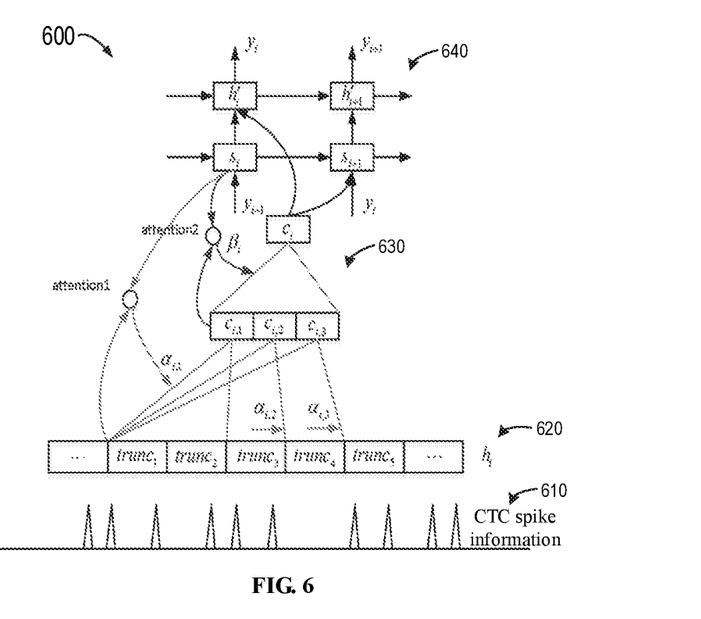
FIG. 6 illustrates a schematic diagram of an example principle of an SMLTA model based on CTC spike information according to an embodiment of the present disclosure.

As illustrated in FIG. 6, with the CTC spike information 610, the sequence 620 of implicit features may be truncated into a plurality of subsequences, where trunc represents a truncation basic unit and one trunc may represent a feature part corresponding to one spike in the sequence 620 of implicit features. In some embodiments, for each spike (which may represent one syllable or a combination of high-frequency phones), a subsequence corresponding to a predetermined number of peaks adjacent to each spike in the sequence of features is selected as a truncation. The predetermined number of spikes include a first number of spikes before each spike and a second number of spikes after each spike. The subsequences may be a feature part corresponding to these spikes. Generally, if a spike has enough spikes before it and after it on timing, the sum of the first number and the second number is equal to the predetermined number. Of course, if there is no first number of spikes before this spike, all spikes before this spike are selected; likewise, if there is no second number of spikes after this spike, all spikes after this spike are selected.

Two-level attention modeling is performed as indicated by an arrow 630. For example, for the $i^{th}$ peak, based on a plurality of overlapping subsequences (e.g., three subsequences in FIG. 6, i.e., trunc1 to trunc2, trunc1 to trunc3, and trunc1 to trunc4) in the sequence 620 of implicit features, a plurality of different feature vectors ($c_{i,1}$, $c_{i,2}$, $c_{i,3}$ in FIG. 6, these feature vectors have corresponding attention vectors at $\alpha_{i,1}$, $\alpha_{i,2}$, $\alpha_{i,3}$) may be determined through first-level attention mechanism (such as attention1 in FIG. 6). Then, based on the plurality of feature vectors (i.e., $c_{i,1}$, $c_{i,2}$, $c_{i,3}$), a context feature vector ($c_i$, which has a corresponding attention vector $\beta_i$) is determined by filtering based on second-level attention mechanism (such as attention2 in FIG. 6). It should be understood that although three feature vectors $c_{i,1}$, $c_{i,2}$, $c_{i,3}$ are illustrated in FIG. 6, other numbers of feature vectors are also possible, which may depend on accuracy and decoding delay time. The number of vectors is not limited in embodiments of the present disclosure.

With reference to FIG. 6, a decoding procedure of the decoder is performed, as illustrated by an arrow 640. The context feature vector c is input to the decoder (e.g., RNN, LSTM, or GRU, etc.) to output a recognition result $y_i$, where $s_i$ indicates an output state and $h'_i$ indicates an implicit state in FIG. 6. In this way, insertion and deletion of the CTC may be effectively solved by the two-level attention, and the speech recognition performance of the SMLTA model is significantly improved.

According to an embodiment of the present disclosure, the CTC spike information is employed to provide truncating information for a modeling method of the attention model, which solves the problem that the conventional attention model has poor modeling accuracy on long sentences. At the same time, it meets requirements of streaming decoding in the real-time speech recognition based on attention modeling technology in the industry, thereby realizing the high-precision attention model for streaming speech services in the world at the first time. Compared with the current best CTC model-based speech recognition system, the recognition error rate of the SMLTA model based on CTC spike information proposed by some embodiments of the present disclosure is reduced by more than 15%.

Therefore, according to some embodiments of the present disclosure, a truncation end-to-end real-time speech recognition method is proposed. This method uses a context-independent syllable as a basic acoustic modeling unit, and employs a modeling manner of jointing CTC and attention. Firstly, the CTC spike information is employed to obtain the position information of truncating the sequence of implicit features, and then the attention modeling technology is introduced to realize the end-to-end speech recognition. In this method, by introducing the truncating information at the specific location, it may avoid the defect that the conventional attention-based modeling method based on the sentence cannot realize real-time decoding, and may have the advantage of higher model precision by means of attention end-to-end modeling, thereby improving performance of speech recognition products. This truncation end-to-end speech recognition modeling method is to realize the structural innovation of end-to-end modeling technology for real-time continuous speech recognition of large-scale vocabulary at the first time.

In addition, some embodiments of the present disclosure also propose a streaming multi-level truncation attention (SMLTA) model based on CTC spike information. The model uses a context-independent syllable or a combination of high-frequency phonemes as the basic acoustic modeling unit. By employing a modeling manner of jointing CTC and attention, speech recognition performance exceeding the significant CTC model is obtained, for example, under tens of thousands of hours of training data. Compared with the conventional attention model that needs to obtain all the implicit features of the entire sentence before perform attention modelling on each modeling unit, the embodiment of the present disclosure innovatively proposes to use the output result (also referred as spike information) of the CTC model to truncate the implicit features into subsequences, and the attention modelling on each modeling unit may be performed independently on a separate subsequence of implicit features. In this way, the model does not need to pay attention to the implicit features of the whole sentence. The attention modeling procedure is constrained on a small feature subsequence, successfully overcoming the problem of poor accuracy of the conventional attention model in a wide range. At the same time, since the spike information of the output of the CTC model is streamed sequentially from left to right, the above subsequences are also streamed sequentially from left to right, so that the SMLTA model of the present disclosure may also be streamed from left to right.

Thus, embodiments of the present disclosure have the following advantages over the conventional speech recognition techniques or models.

Compared with the conventional CTC model, the embodiment of the present disclosure effectively implements the modeling of jointing the acoustic model and the language model through the training jointly the CTC and the attention, and overcomes the deficiencies of the conventional CTC model only for the acoustic model. The robustness of the speech recognition system in complex environments may be improved. In addition, due to the insertion and deletion problems of the CTC model, the information provided by the CTC model to the attention model may also be wrong. Therefore, some embodiments of the present disclosure effectively solve the deficiencies of the CTC model through the two-level attention structure, and significantly improve the speech recognition performance.

Compared to the conventional attention models, some embodiments of the present disclosure use the truncating information of the speech signal to perform the truncation attention model, avoiding the problem that the speech recognition system of the conventional attention model cannot decode in real time and meeting the user's demand for system response speed. In addition, compared with the conventional attention model has low recognition accuracy on long sentences, the embodiment of the present disclosure may use the truncating information to concentrate the attention modeling of each modeling unit on each subsequence of features. It may improve the modeling accuracy of the attention model and solves the problem of poor modeling accuracy of the attention model in a wide range.

Compared to the conventional attention model that supports fixed-length segmentation, the embodiment of the present disclosure may obtain the more accurate subsequence of features. In addition, some embodiments of the present disclosure achieve overlapping of subsequences through the two-level attention, and can more effectively filter features, thereby obtaining performance in which the modeling accuracy exceeds the sentence attention method.

In addition, the compact STMLA model integrated with CTC and attention, provided in some embodiments of the present disclosure. The model has the head of the CTC module 540 and the head of the attention decoder 550, and the training may be performed on the both heads together. The head of the CTC module 540 is trained with a CTC loss function, and the head of the attention decoder 550 is trained with a cross-entropy loss function. The two loss functions are connected by linear difference weights. This model almost has the same computation amount online as one model, but provides both CTC and attention information, thereby realizing large-scale industrial deployment.

Figure 7:
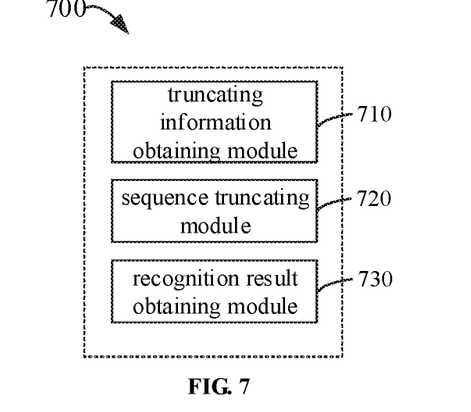
FIG. 7 illustrates a block diagram of an apparatus for real-time speech recognition according to an embodiment of the present disclosure.

FIG. 7 illustrates a block diagram of an apparatus for real-time speech recognition according to an embodiment of the present disclosure. As illustrated in FIG. 7, the apparatus 700 includes a truncating information obtaining module 710, a sequence truncating module 720 and a recognition result obtaining module 730. The truncating information obtaining module 710 is configured to, based on an input speech signal, obtain truncating information for truncating a sequence of features of the speech signal. The sequence truncating module 720 is configured to, based on the truncating information, truncate the sequence of features into a plurality of subsequences. The recognition result obtaining module 730 is configured to, for each subsequence in the plurality of subsequences, obtain a real-time recognition result through attention mechanism.

In some embodiments, the truncating information obtaining module 710 includes a spike information obtaining module and a truncating information determining module. The spike information obtaining module is configured to obtain spike information related to the speech signal by performing connectionist temporal classification (CTC) on the sequence of features. The truncating information determining module is configured to determine the truncating information based on the spike information.

In some embodiments, the recognition result obtaining module 730 includes a first attention modeling module and a second attention modeling module. The first attention modeling module is configured to perform a first attention modeling of an attention model on a first one of the plurality of subsequences, in which the attention model is for enabling to select a feature for weighting. The second attention modeling module is configured to perform a second attention modeling of the attention model on a second one of the plurality of subsequences, in which the first attention modeling is different from the second attention modeling.

In some embodiments, the apparatus 700 includes a shared encoder, a CTC module and an attention decoder. The shared encoder is configured to encode the speech signal into the sequence of features. The CTC module is configured to obtain the spike information based on the sequence of features. The attention decoder is configured to obtain the real-time recognition result based on the sequence of features and the spike information, in which the shared encoder is shared by the CTC module and the attention decoder. The truncating information obtaining module 710 is included in the CTC module. The sequence truncating module 720 and the recognition result obtaining module 730 are included in the attention decoder.

In some embodiments, the apparatus 700 includes a first loss function determining module, a second loss function determining module and a training module. The first loss function determining module is configured to determine a first loss function for training the CTC module. The second loss function determining module is configured to determine a second loss function for training the attention decoder. The training module is configured to train the CTC module and the attention decoder together by using the first loss function and the second loss function.

In some embodiments, the sequence truncating module 720 includes a subsequence selection module. The subsequence selection module is configured to, for each spike in the spike information, select a subsequence corresponding to a predetermined number of peaks adjacent to each spike in the sequence of features, the predetermined number of spikes comprising a first number of spikes before each spike a spike and a second number of spikes after each spike.

In some embodiments, the recognition result obtaining module 730 includes a feature vector determining module, a context feature determining module and a recognition result determining module. The feature vector determining module is configured to determine a plurality of feature vectors by a first level attention mechanism based on a plurality of overlapping subsequences in the sequence of features. The context feature determining module is configured to determine a context feature vector by a second level attention mechanism based on the plurality of feature vectors. The recognition result determining module is configured to determine the real-time recognition result based on the context feature vector.

In some embodiments, the sequence of features is a sequence of implicit features and each peak is indicative to a syllable or a set of phones.

It should be understood that the truncating information obtaining module 710, the sequence truncating module 720 and the recognition result obtaining module 730 illustrated in FIG. 7 may be included in a single electronic device or multiple electronic devices. Moreover, it should be understood that the modules illustrated in FIG. 7 may perform steps or actions in the methods or procedures of the embodiments of the present disclosure.

Figure 8:
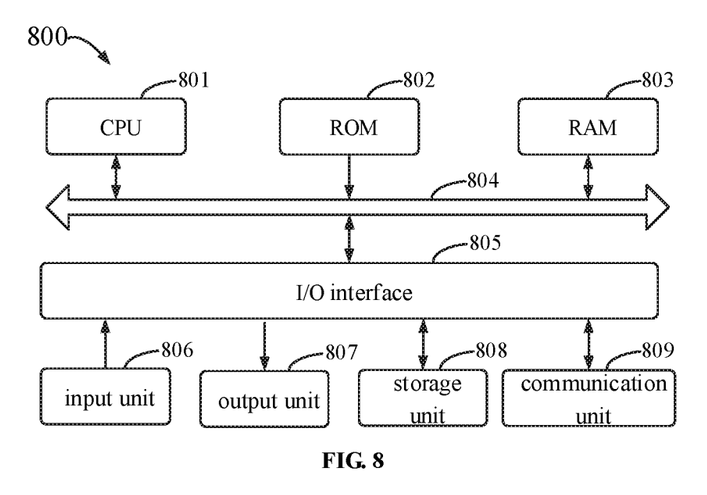
FIG. 8 illustrates a block diagram of an exemplary electronic device capable of implementing embodiments of the present disclosure.

FIG. 8 illustrates a block diagram of an exemplary electronic device 800 capable of implementing embodiments of the present disclosure. It should be understood that the device 800 may be configured to implement the above apparatus 700, user device 220, or device 230. The device 800 may include a central processing unit (CPU) 801. The CPU 801 may perform various appropriate actions and processing based on computer program instructions stored in a read only memory (ROM) 802 or computer program instructions loaded to a random-access memory (RAM) 803 from a storage unit 808. In the RAM 803, various programs and data required for operations of the device 800 may also be stored. The CPU 801, the ROM 802 and the RAM 803 may be coupled to each other through a bus 804. An input/output (I/O) interface 805 is also coupled to the bus 804.

A plurality of components in the device 800 are coupled to the I/O interface 805, which include: an input unit 806, such as a keyboard, a mouse; an output unit 807, such as a display, a speaker; a storage unit 808, such as a disk, an optical disk; and a communication unit 809, such as a network card, a modem, a wireless communication transceiver. The communication unit 809 allows the device 800 to exchange information/data with other devices over computer networks such as Internet and/or telecommunication networks.

The CPU 801 performs methods and procedures described above, such as the method 300. For example, in some embodiments, a method may be implemented as computer programs that are tangibly embodied in a machine-readable medium, such as the storage unit 808. In some embodiments, some or all of the computer programs may be loaded and/or installed onto the device 800 via the ROM 802 and/or the communication unit 809. When computer programs are loaded into the RAM 803 and executed by the CPU 801, one or more actions or steps of the methods described above may be performed. Alternatively, in other embodiments, the CPU 801 may be configured to perform the method by any other suitable means (e.g., by means of firmware).

The functions described above herein may be performed at least partly by one or more hardware logic components. For example, without limitation, exemplary types of hardware logic components may include: Field-Programmable Gate Array (FPGA), Application Specific Integrated Circuit (ASIC), Application Specific Standard Parts (ASSP), System on a Chip (SOC), Complex Programmable Logic Device (CPLD), and the like.

Program codes for implementing the methods of the present disclosure may be written in any combination of one or more programming languages. The program codes may be provided to a general-purpose computer, a special-purpose computer, or a processor or controller of other programmable data processing apparatus, such that when the program codes are executed by the processor or controller, functions and/or operations specified in the flow charts and/or block diagrams are implemented. The program codes may be executed on the machine entirely, or partly. As a stand-alone software package, a part of the program codes may be executed on the machine and another part of the program codes may be executed on the remote machine, or the program codes may be executed on the remote machine or server entirely.

In the context of the present disclosure, a machine-readable medium may be a tangible medium that may contain or store programs used by an instruction execution system, apparatus, or device, or used in connection with an instruction execution system, apparatus, or device. The machine-readable medium may be a machine-readable signal medium or a machine-readable storage medium. The machine-readable storage medium may be, for example, but not limited to, electronic, magnetic, optical, electromagnetic, infrared, or semiconductor system, apparatus, or device, or any suitable combination of the foregoing. More specific examples of the machine-readable medium comprise but are not limited to: an electronic connection (an electronic device) with one or more wires, a portable computer enclosure (a magnetic device), a hard dish, a random-access memory (RAM), a read only memory (ROM), an erasable programmable read-only memory (EPROM or a flash memory), an optical fiber device, a portable compact disk read-only memory (CDROM), an optical storage device, a magnetic storage device, or any suitable combination of the foregoing.

In addition, although the actions or steps are described in a particular order, this should be understood that such actions or steps are required to be performed in the particular order illustrated or in the sequence, or all illustrated actions or steps should be executed to achieve the desired result. Multitasking and parallel processing may be advantageous in certain circumstances. Likewise, although several implementation details are included in the above discussion, these should not be construed as limiting the scope of the disclosure. Certain features that are described in the context of in separate embodiments may also be implemented in combination in a single implementation. Conversely, various features that are described in the context of a single implementation may be implemented in a plurality of implementations, either individually or in any suitable sub-combination.

Although the embodiments of the present disclosure have been described in terms of features and/or actions, it is understood that the subject matter defined in the appended claims is not limited to the particular features or actions described. Instead, the specific features and actions described above are merely exemplary forms of implementing the claims.

What is claimed is:

1. A method for speech recognition, comprising:
based on an input speech signal, obtaining, by one or more computing devices, truncating information for truncating a sequence of features of the speech signal, comprising: obtaining, by the one or more computing devices, spike information related to the speech signal by performing connectionist temporal classification (CTC) on the sequence of features, and determining, by the one or more computing devices, the truncating information based on the spike information;
based on the truncating information, truncating, by the one or more computing devices, the sequence of features into a plurality of subsequences; and
for each subsequence in the plurality of subsequences, obtaining, by the one or more computing devices, a recognition result through attention mechanism.

2. The method of claim 1, wherein the obtaining the recognition result through the attention mechanism, comprises:
performing, by the one or more computing devices, a first attention modeling of an attention model on a first one of the plurality of subsequences, the attention model for enabling to select a feature for weighting; and
performing, by the one or more computing devices, a second attention modeling of the attention model on a second one of the plurality of subsequences, the first attention modeling being different from the second attention modeling.

3. The method of claim 1, wherein
encoding the speech signal into the sequence of features by a shared encoder;

obtaining the spike information based on the sequence of features by a CTC module; and obtaining the recognition result by an attention decoder based on the sequence of features and the spike information, the shared encoder being shared by the CTC module and the attention decoder.

4. The method of claim 3, further comprising:

determining, by the one or more computing devices, a first loss function for training the CTC module;

determining, by the one or more computing devices, a second loss function for training the attention decoder; and training, by the one or more computing devices, the CTC module and the attention decoder together by using the first loss function and the second loss function.

5. The method of claim 1, wherein the truncating the sequence of features into the plurality of subsequences, comprises:

for each spike in the spike information, selecting, by the one or more computing devices, a subsequence corresponding to a predetermined number of peaks adjacent to each spike in the sequence of features, the predetermined number of spikes comprising a first number of spikes before each spike a spike and a second number of spikes after each spike.

6. The method of claim 5, wherein the obtaining the recognition result through the attention mechanism, comprises:

determining, by the one or more computing devices, a plurality of feature vectors by a first level attention mechanism based on a plurality of overlapping subsequences in the sequence of features;

determining, by the one or more computing devices, a context feature vector by a second level attention mechanism based on the plurality of feature vectors; and determining, by the one or more computing devices, the recognition result based on the context feature vector.

7. The method of claim 5, wherein the sequence of features is a sequence of implicit features and each peak is indicative to a syllable or a set of phones.

8. An electronic device, comprising:

one or more processors; and a storage device for storing one or more programs, wherein when the one or more programs are executed by the one or more processors, the one or more processors are configured to implement:

based on an input speech signal, obtain truncating information for truncating a sequence of features of the speech signal;

based on the truncating information, truncate the sequence of features into a plurality of subsequences; and for each subsequence in the plurality of subsequences, obtain a recognition result through attention mechanism, wherein the one or more processors are configured to obtain the truncating information for truncating the sequence of features of the speech signal by actions of:

obtaining spike information related to the speech signal by performing connectionist temporal classification (CTC) on the sequence of features; and determining the truncating information based on the spike information.

9. The electronic device of claim 8, wherein the one or more processors are configured to obtain the recognition result through the attention mechanism by actions of:

performing a first attention modeling of an attention model on a first one of the plurality of subsequences, the attention model for enabling to select a feature for weighting; and performing a second attention modeling of the attention model on a second one of the plurality of subsequences, the first attention modeling being different from the second attention modeling.

10. The electronic device of claim 8, further comprising:

a shared encoder, configured to encode the speech signal into the sequence of features;

a CTC module, configured to obtain the spike information based on the sequence of features; and an attention decoder, configured to obtain the recognition result based on the sequence of features and the spike information, the shared encoder being shared by the CTC module and the attention decoder.

11. The electronic device of claim 10, wherein the one or more processors are configured to:

determine a first loss function for training the CTC module;

determine a second loss function for training the attention decoder; and train the CTC module and the attention decoder together by using the first loss function and the second loss function.

12. The electronic device of claim 10, wherein the one or more processors are configured to truncate the sequence of features into the plurality of subsequences by actions of:

for each spike in the spike information, selecting a subsequence corresponding to a predetermined number of peaks adjacent to each spike in the sequence of features, the predetermined number of spikes comprising a first number of spikes before each spike a spike and a second number of spikes after each spike.

13. The electronic device of claim 12, wherein the one or more processors are configured to obtain the recognition result through the attention mechanism by acts of:

determining a plurality of feature vectors by a first level attention mechanism based on a plurality of overlapping subsequences in the sequence of features;

determining a context feature vector by a second level attention mechanism based on the plurality of feature vectors; and determining the recognition result based on the context feature vector.

14. The electronic device of claim 12, wherein the sequence of features is a sequence of implicit features and each peak is indicative to a syllable or a set of phones.

15. A non-transitory computer-readable storage medium having stored therein computer programs that, when executed by a processor, cause a processor to implement:

based on an input speech signal, obtain truncating information for truncating a sequence of features of the speech signal;

based on the truncating information, truncate the sequence of features into a plurality of subsequences; and for each subsequence in the plurality of subsequences, obtain a recognition result through attention mechanism, wherein the storage medium further comprises computer programs that, when executed by a processor, cause a processor to implement obtain the truncating information for truncating the sequence of features of the speech signal by actions of:

obtaining spike information related to the speech signal by performing connectionist temporal classification (CTC) on the sequence of features; and determining the truncating information based on the spike information.

16. The non-transitory computer-readable storage medium of claim 15, further comprising computer programs that, when executed by a processor, cause a processor to implement obtain the recognition result through the attention mechanism by actions of:

performing a first attention modeling of an attention model on a first one of the plurality of subsequences, the attention model for enabling to select a feature for weighting; and performing a second attention modeling of the attention model on a second one of the plurality of subsequences, the first attention modeling being different from the second attention modeling.

17. The non-transitory computer-readable storage medium of claim 15, further comprising computer programs that, when executed by a processor, cause a processor to implement:

encode the speech signal into the sequence of features by a shared encoder;

obtain the spike information based on the sequence of features by a CTC module; and obtain the recognition result by an attention decoder based on the sequence of features and the spike information, the shared encoder being shared by the CTC module and the attention decoder.

18. The non-transitory computer-readable storage medium of claim 17, further comprising computer programs that, when executed by a processor, cause a processor to implement:

determining, by the one or more computing devices, a first loss function for training the CTC module;

determining, by the one or more computing devices, a second loss function for training the attention decoder; and training, by the one or more computing devices, the CTC module and the attention decoder together by using the first loss function and the second loss function.

19. The non-transitory computer-readable storage medium of claim 15, wherein the truncating the sequence of features into the plurality of subsequences, comprises:

for each spike in the spike information, selecting, by the one or more computing devices, a subsequence corresponding to a predetermined number of peaks adjacent to each spike in the sequence of features, the predetermined number of spikes comprising a first number of spikes before each spike a spike and a second number of spikes after each spike.

20. The non-transitory computer-readable storage medium of claim 19, wherein the obtaining the recognition result through the attention mechanism, comprises:

determining, by the one or more computing devices, a plurality of feature vectors by a first level attention mechanism based on a plurality of overlapping subsequences in the sequence of features;

determining, by the one or more computing devices, a context feature vector by a second level attention mechanism based on the plurality of feature vectors; and determining, by the one or more computing devices, the recognition result based on the context feature vector.

* * * * *